3,173,796
TREATMENT OF LACTYLATED GLYCERIDE ESTERS
Morton Pader, West Englewood, N.J., assignor to Lever Brothers Company, New York, N.Y., a corporation of Maine
No Drawing. Filed Feb. 1, 1962, Ser. No. 170,487
10 Claims. (Cl. 99—123)

This invention relates to an improvement in the production of lactylated glycerides and more particularly to a treatment of lactylated mono- and diglycerides to improve the flavor thereof.

Lactylated mono- and diglycerides of fatty acids such as glyceryl lactopalmitate, glyceryl lactostearate, and glyceryl lacto-oleate are well-known commercial materials which have been used as emulsifiers in cake mixes and as additives in shortenings. The preparation of these materials has been described in a number of patents including U.S. Patents No. 2,480,332, 2,509,414, and 2,690,971. While these materials function acceptably well as emulsifiers, their usefulness in food products is restricted in several applications. These lactylated mono- and diglycerides of fatty acids may have a bitter off-flavor which makes them quite unsuitable as additives in bland-flavored food products such as dry mixes for dessert toppings, white layer cake mixes, and the like, and which severely limits their use where relatively large amounts are required.

It is an object of this invention to develop a process for removing the off-flavors associated with lactylated mono- and diglycerides of fatty acids.

Another object is to improve the quality of bland-flavored food products containing lactylated mono- and diglycerides of fatty acids.

Still another object is to improve the stability of lactylated mono- and diglycerides of fatty acids when present in food mixtures.

Other objects and advantages will be apparent from the following description of the invention.

It has been discovered that the bitter off-flavor associated with lactylated mono- and diglycerides can be removed by contacting the esters with a suitable inorganic alkaline agent selected from the group consisting of alkali metal carbonates and bicarbonates and alkaline earth metal hydroxides at an elevated temperature, removing the solid material from the mixture, and subsequently deodorizing the treated ester under substantially vacuum conditions. After this treatment, the lactylated esters no longer have a bitter off-flavor and can be used with impunity in bland-flavored food products.

The esters which can be beneficially treated according to the principles of this invention comprise the lactylated esters of fatty acid mono- and diglycerides. These materials are usualy prepared by reacting lactic acid with the mixtures of fatty acid mono- and diglycerides derived from conventional animal and vegetable sources. Commercially available materials include "Drumulse 9327" (glyceryl lacto-oleate) and "Drumulse 9169". The latter material is apparently a mixture of the following compounds: glyceryl monopalmitin (alpha), glyceryl dipalmitin, glyceryl tripalmitin, glyceryl dilacto-monopalmitin, glyceryl monolacto-monopalmitin, and glyceryl monolacto-dipalmintin. For examples of other lactylated esters and methods for their preparation, attention is directed to the aforementioned U.S. patents whose disclosures are incorporated herein by reference.

As the alkaline treating agent to be utilized in the present process, it is preferred to use at least one compound selected from the group consisting of alkali metal carbonates, alkali metal bicarbonates, and alkaline earth metal hydroxides. Specific examples of agents include the carbonates and bicarbonates of sodium, potassium and lithium, as well as the hydroxides of calcium and magnesium. It has been found that $Na_2CO_3$, $NaHCO_3$ and $Mg(OH)_2$ are among the most effective agents for eliminating the off-flavor components from the esters.

Generally speaking, the level of inorganic alkaline agent which can be used should be the smallest possible proportion which will effectively remove the off-flavor ingredients. When small amounts are employed, the loss of ester by entrainment with the alkaline agent during the subsequent removal of the solid materials from the reaction mixture is held to a minimum. A ratio of alkaline agent to ester as low as about 0.2 to 1.0 has achieved effective removal of the off-flavor components from the ester. The optimum level of agent can be readily ascertained by initiating a preliminary run.

An important condition to be observed during the initial treatment is to see that strong agitation of the reaction mixture is effected. It is theorized that the reaction between the alkaline agent and the off-flavor impurities in the ester occurs at the surfaces of the particles of alkaline agent. Consequently, new surfaces must constantly be exposed by agitation for the reaction to continue.

Simple mixing with a stirrer is not very effective unless continued for some time. It is preferred that the alkaline agent be constantly comminuted by such means as are known in the art. The type of agitation to produce the required shearing or comminuting can be obtained by use of a "Jet Mixer" or by cycling the reaction mixture continuously or intermittently through a colloid mill, or by use of a "Waring Blendor." The reaction mixture can also be cycled continuously or intermittently through a comminuting mill equipped with a fine screen. However, other means for obtaining this preferred type of agitation are well known and can be used in the process of this invention.

The reaction time varies with the type of agitation, the shortest reaction period occuring when the agitation is most efficient. A reaction time of thirty minutes was sufficient when a "Jet Mixer" was used for agitation at a temperature of about 50°–55° C. with only slight improvment obtained by extending the time to sixty minutes. However, a five-minute reaction period was not sufficient to complete the reaction using a "Jet Mixer." When the mixture was cycled through a colloid mill, excellent results were obtained in less than thirty minutes.

The optimum reaction temperature is about 50°–55° C. At temperatures above about 70° C., there is a tendency for the mixture to foam and off-flavors develop, while at lower temperatures, the ester tends to be non-fluid. Generally speaking, a reaction temperature should be chosen which is just high enough to maintain the fluidity of the ester, thereby to facilitate reaction with the inorganic alkaline agent.

The initial reaction between the lactylated ester and the alkaline agent is preferably carried out in the absence of substantial amounts of oxygen. For example, a nitrogen atmosphere can be employed during the reaction.

It has been found desirable at times to admix the ester with a non-aqueous, inert solvent. In this way, the ester is readily maintained in a fluid state and less ester is lost in the subsequent removal of solid material. The filter cake obtained after the reaction mixture is filtered ran be washed with the solvent to recover any ester entrapped therein. The preferred non-aqueous solvent is an edible oil which is admixed with the ester prior to the treatment. The oil employed can be a portion of that used for the shortening or other fat composition in which the ester is to be eventually included. A convenient mixture contains about 65 parts of vegetable oil and about 35 parts of ester. The amount of oil or other solvent to be employed as the vehicle for the ester is relatively unimportant as long as the ester is maintained in a liquid condition for reaction.

It is also important that substantially anhydrous conditions be maintained during the reaction. The presence of water is detrimental and adequate precautions should be taken to insure anhydrous conditions.

After the initial reaction has been completed, the solid residue must be separated from the ester. This is accomplished by filtering the reaction mixture or by centrifugation or by any other conventional method. Alkaline treating agents which remain in a relatively granular state during the reaction are readily filtered and sodium bicarbonate is a particularly preferred reagent for this reason.

Following the filtration, the filtrate is deodorized by heating with steam at about 150° C. under a vacuum for about one hour. The deodorization removes any volatile off-flavor impurities originally present in the ester or created during the treatment. Deodorizing conditions can be varied in accordance with well-known concepts, e.g., nitrogen may be used instead of steam. However, higher temperatures tend to degrade the ester as evidenced by discoloration. The vacuum maintained during the deodorization is preferably lower than about 5 mm. of mercury.

The following examples illustrate the process according to the invention. It will be understood, however, that these examples are included merely for purposes of illustration and are not intended to limit the scope of the invention as described herein, unless otherwise specifically indicated.

*Example 1*

A blend containing 50% of Covo, a commercial vegetable oil shortening containing no emulsifier and 50% of a commercial glyceryl lactopalmitate was treated with 0.5 part of sodium carbonate per part of glyceryl lactopalmitate under anhydrous conditions for one hour at 50°–55° C. under a nitrogen blanket using "Jet Mixer" agitation. After filtration, the mixture was deodorized under vacuum using steam for one hour at 150° C.

A shortening was then prepared containing 14% of the deodorized mixture to provide a shortening containing 7% glyceryl lactopalmitate. A similar shortening containing 7% untreated glyceryl lactopalmitate was prepared for use as a control.

White layer cakes containing each of these two shortenings were then prepared. The batter composition and baking conditions for the cakes were as follows:

|  | Grams |
|---|---|
| Cake flour | 200 |
| Sugar | 250 |
| Baking powder | 14 |
| Salt | 4 |
| Shortening | 100 |
| Egg whites | 90 |
| Milk | 240 |

The dry solids, shortening, and ⅔ of the milk were mixed for two minutes at speed 5 with a "Mixmaster." The remaining milk and egg whites were added and the whole batter mixed for two minutes at speed 5. The batter was then divided between two eight-inch layer cake pans and baked at 375° F. for 25 minutes.

The white layer cake prepared with the shortening treated with sodium carbonate had no bitter flavor when compared with the cake prepared using the control shortening. No difference other than in flavor was found between the experimental and control cakes; the volume and texture of the cakes were essentially the same. The actual values obtained were as follows:

|  | Untreated | Treated |
|---|---|---|
| Batter Volume (cc./gm.) | 1.35 | 1.32 |
| Cake Volume (cc.) | 1,000 | 975 |

Both cakes were essentially the same in volume and texture. The cake made with the treated material was much preferred, however, because of its better flavor.

*Example 2*

A whipped topping mix was prepared according to the following formulation:

|  | Percent |
|---|---|
| Glyceryl lactopalmitate [1] | 7.0 |
| Glyceryl lacto-oleate [1] | 0.5 |
| Hydrogenated vegetable oil, 65 I.V. | 41.7 |
| Lecithin | 1.0 |
| Sodium caseinate | 8.0 |
| Sucrose | 40.8 |
| Gum arabic | 1.0 |
|  | 100.0 |

[1] Commercial products.

70 grams of this composition was whipped with about ½ cup of milk. The topping obtained had a good texture but a bitter off-flavor.

Portions of the glyceryl lactopalmitate and glyceryl lacto-oleate used above were then treated with 22% by weight of $Na_2CO_3$ for one hour at 50°–55° C. following the method outlined in Example 1. The treated materials were then used to prepare a second topping mix. Both whipped products were identical in texture, appearance and stability. However, the topping prepared with the treated esters did not have the undesirable bitter off-flavor.

*Example 3*

Three batches of shortening, one of 150 pounds, one of 200 pounds, and one of 300 pounds were processed according to the present invention. Each batch of shortening had the following composition:

|  | Percent |
|---|---|
| Glyceryl lacto-palmintate ("Drumulse 9169") | 32.5 |
| Glyceryl lacto-oleate ("Drumulse 9327") | 2.3 |
| 65 iodine value peanut oil, selectively hydrogenated | 65.2 |

The alkaline agent was analytical grade sodium bicarbonate, powdered and anhydrous. The sodium bicarbonate was added at a 13% level, based on the total weight of the mixture. This corresponds to about 0.37 part of sodium bicarbonate per part of lactylated glyceryl esters.

The peanut oil was melted and charged to a 50-gallon, glass-lined, jacketed Pfaudler tank equipped with a Lightin' Mixer. The latter was equipped with a propeller-type agitator. The lacto-glycerides were added to the oil and the temperature of the mixture adjusted to 56°–58° C. The required amount of sodium bicarbonate was dispersed in the oil-emulsifier mixture and this bicarbonate-oil-emulsifier mixture was then pumped to a Charlotte Mill, a colloid mill equipped with a grinding head, at a rate of 33.3 pounds per minute. The mill opening was 0.034 inch. The mixture was piped from the colloid mill to another 50-gallon Pfaudler tank equipped with a Typhoon Mixer, which had a turbine-type agitator. A stream of nitrogen was blown over each of the open Pfaudler tanks. The fine dispersion was agitated until the entire batch had passed through the Charlotte Mill. The mixture was then pumped back through the Charlotte Mill to the first Pfaudler tank equipped with the Lightin' Mixer. This process was repeated as many times as possible in a time span of 45 minutes. Below is a table giving the batch size and number of passes of the mixture through the Charlotte Mill.

Batch size:  Number of passes
- 150 pounds — 10
- 200 pounds — 8
- 300 pounds — 6

The mixture was then allowed to settle and the oil-emulsifier mixture decanted. The decanted material was filtered by pumping through a filter press. The filtered material was finally deodorized at 150° C. for about one hour under a pressure of 2-3 mm. of mercury with stripping steam. All parts of equipment in contact with the oil-emulsifier mixture were of stainless steel construction.

The improved mixtures of lactylated glycerides and hydrogenated vegetable oil prepared above were used to prepare cake batters and dry topping mixes of the type described in Examples 1 and 2. The products obtained exhibited no bitter off-flavors.

It will occur to those skilled in the art that there are many modifications to the invention as specifically described herein. It is intended to include all such modifications within the scope of the appended claims.

I claim:

1. In a process for improving the flavor of a preparation of a lactylated fatty acid ester of glycerol, the improvement which comprises:
   (a) agitating said preparation with an inorganic alkaline agent selected from the group consisting of alkali metal carbonates, alkali metal bicarbonates, and alkaline earth metal hydroxides at an elevated temperature sufficient to facilitate the improvement in flavor but below the decomposition temperature of said ester and under substantially anhydrous conditions, and
   (b) removing the solid material from the reaction mixture.

2. The process according to claim 1 wherein an edible oil is admixed with the ester.

3. A process according to claim 1 wherein the agent is sodium carbonate.

4. A process according to claim 1 wherein the agent is sodium bicarbonate.

5. A process according to claim 1 wherein the agent is magnesium hydroxide.

6. A process according to claim 1 wherein the treated preparation is deodorized following the removal of the solid material.

7. In a process for improving the flavor of a preparation of a lactylated fatty acid ester of glycerol, the improvement which comprises:
   (a) reacting said preparation with an inorganic alkaline agent selected from the group consisting of alkali metal carbonates, alkali metal bicarbonates, and alkaline earth metal hydroxides, at a temperature of about 50-55° C. in the substantial absence of water and under conditions of agitation such that the particles of alkaline agent are continuously being comminuted, and
   (b) removing the solid material from the reaction mixture by filtration.

8. A process according to claim 7 wherein the proportion of alkaline agent to ester is at least about 0.2 to 1.0, respectively.

9. A process according to claim 7 wherein an edible oil is admixed with the ester during the treatment.

10. A process according to claim 7 wherein the treated preparation is deodorized following the removal of the solid material.

References Cited in the file of this patent

UNITED STATES PATENTS

| | | |
|---|---|---|
| 2,480,332 | Little | Aug. 30, 1949 |
| 2,509,414 | Barsky | May 30, 1950 |
| 2,690,971 | Iveson et al. | Oct. 5, 1954 |